(12) United States Patent
Cho

(10) Patent No.: US 10,807,658 B1
(45) Date of Patent: Oct. 20, 2020

(54) APPARATUS WITH ROTATABLE MOUNTING ASSEMBLY

(71) Applicant: Alex Cho, Chantilly, VA (US)

(72) Inventor: Alex Cho, Chantilly, VA (US)

( * ) Notice: Subject to any disclaimer, the term of this patent is extended or adjusted under 35 U.S.C. 154(b) by 0 days.

(21) Appl. No.: 16/561,939

(22) Filed: Sep. 5, 2019

(51) Int. Cl.
*B62D 43/02* (2006.01)
*B60B 29/00* (2006.01)

(52) U.S. Cl.
CPC ............ *B62D 43/02* (2013.01); *B60B 29/001* (2013.01)

(58) Field of Classification Search
CPC .. Y10T 70/5987; B62D 43/002; B62D 43/08; B62D 43/02; B60R 9/06; B60R 9/10
See application file for complete search history.

(56) References Cited

U.S. PATENT DOCUMENTS

| | | | | |
|---|---|---|---|---|
| 1,472,983 A * | 11/1923 | Lawrence | ............... | B62D 43/02 414/463 |
| 3,753,520 A * | 8/1973 | Bodde | .................... | B62D 43/02 224/503 |
| 4,234,284 A * | 11/1980 | Hauff | ........................ | B60R 9/06 224/282 |
| 4,858,802 A * | 8/1989 | Hamby | ................... | B63B 32/20 224/406 |
| 5,232,035 A * | 8/1993 | Adams, Jr. | ............ | B25H 1/0021 157/1.17 |
| 5,385,280 A * | 1/1995 | Littlepage | ................. | B60R 9/06 224/521 |
| 5,449,101 A | 9/1995 | Van Dusen | | |
| 5,469,998 A | 11/1995 | Van Dusen et al. | | |
| 5,538,168 A | 7/1996 | Burger et al. | | |
| 5,580,088 A | 12/1996 | Griffith | | |
| 5,992,720 A * | 11/1999 | Miller | ....................... | B60R 9/12 224/315 |
| 6,193,124 B1 * | 2/2001 | Brazil | ....................... | B60R 9/06 224/521 |
| 6,386,817 B1 * | 5/2002 | Cash | .................... | A61G 3/0209 414/462 |
| 6,854,630 B2 * | 2/2005 | Anderson | ................. | B60R 9/06 224/506 |
| 6,857,839 B2 * | 2/2005 | Pitoniak | ................. | B62D 43/02 224/509 |
| 8,251,265 B2 | 8/2012 | Grudek | | |
| 8,840,000 B1 | 9/2014 | Simpson | | |
| 9,199,677 B2 | 12/2015 | Hendrickson | | |
| 9,254,790 B2 * | 2/2016 | Dreger | ..................... | B60R 9/10 414/462 |

(Continued)

*Primary Examiner* — Gregory W Adams
(74) *Attorney, Agent, or Firm* — Mannava & Kang, P.C.

(57) ABSTRACT

According to examples, an apparatus may include an elongated member, a mounting assembly, and a support member. The mounting assembly may include an extension section having a first end and a second end and a first connection member connected to the first end of the extension section and having a first opening, in which the elongated member may extend through the first opening in the first connection member, and in which the first connection member may be slidable along a length of the elongated member and rotatable about a longitudinal axis of the elongated member. The mounting assembly may also include a second connection member connected the second end of the extension section and having a second opening, in which the support member may extend through the second opening.

16 Claims, 5 Drawing Sheets

(56) References Cited

U.S. PATENT DOCUMENTS

2010/0264187 A1* 10/2010 Buskirk ................ B62D 43/02
                                                                  224/502
2012/0237324 A1*  9/2012 Egan ........................ B60R 9/06
                                                                  414/462

* cited by examiner

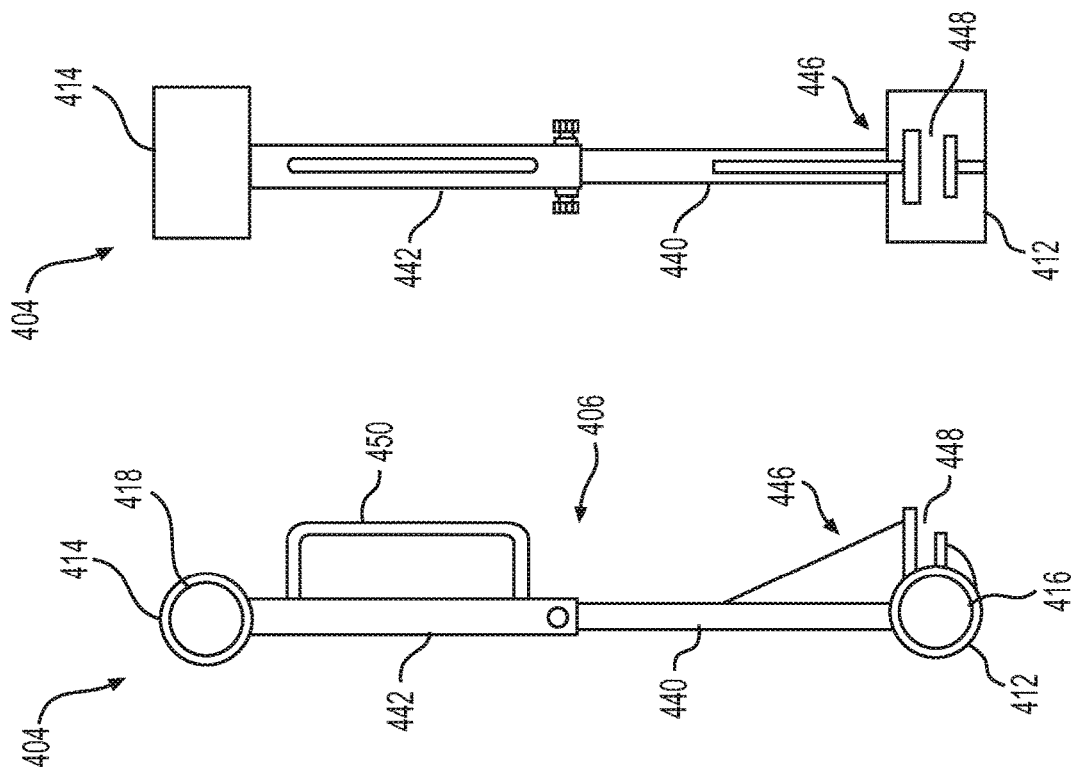
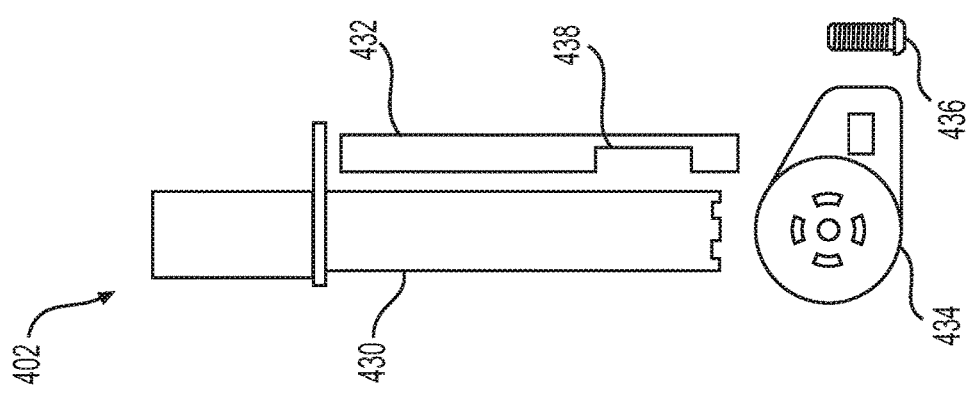

APPARATUS WITH ROTATABLE MOUNTING ASSEMBLY

BACKGROUND

Some types of motor vehicles, such as four-wheel drive, off-road vehicles, may include spare tires that are mounted to the rears of the motor vehicles. These types of motor vehicles often have large spare tires, e.g., in comparison to standard-sized motor vehicles. Such types of spare tires and the wheels to which the tires are installed may be relatively heavy, e.g., about 100 pounds or more.

BRIEF DESCRIPTION OF THE DRAWINGS

Features of the present disclosure are illustrated by way of example and not limited in the following figure(s), in which like numerals indicate like elements, in which:

FIGS. 4B-4D, respectively, depict components of the apparatus depicted in FIGS. 3A, 3B, and 4A, in accordance with an embodiment of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, which may equivalently be termed a hoist, a tire hoist, a lifting mechanism, or the like, that may facilitate raising and/or lowering of an article. Particularly, an apparatus disclosed herein may support an article and may provide various levels of leverage as the article is lowered and/or raised. The apparatus may thus make it relatively easier to raise and/or lower the article. In some examples, an apparatus disclosed herein may be mounted to a tow hitch of a motor vehicle and the article may be a wheel that is to be moved from or to a mounting mechanism on the motor vehicle.

Figure 1B:
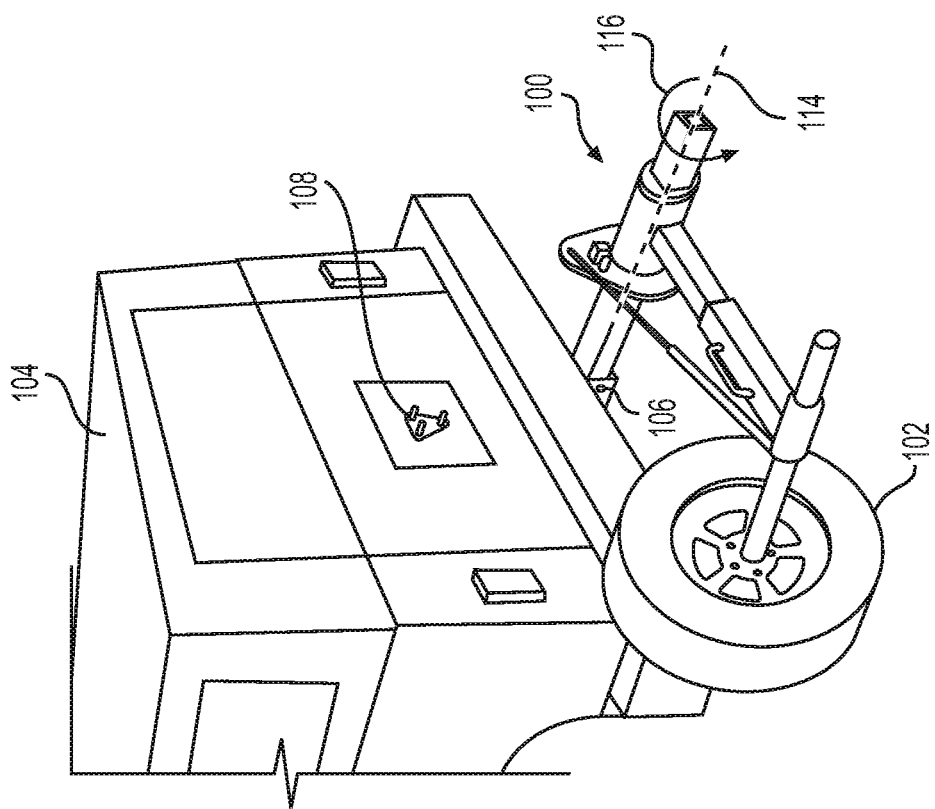
FIGS. 1A and 1B, respectively, show block diagrams of an example apparatus that may support an article with respect to a vehicle, in accordance with an embodiment of the present disclosure.
Figure 1A:
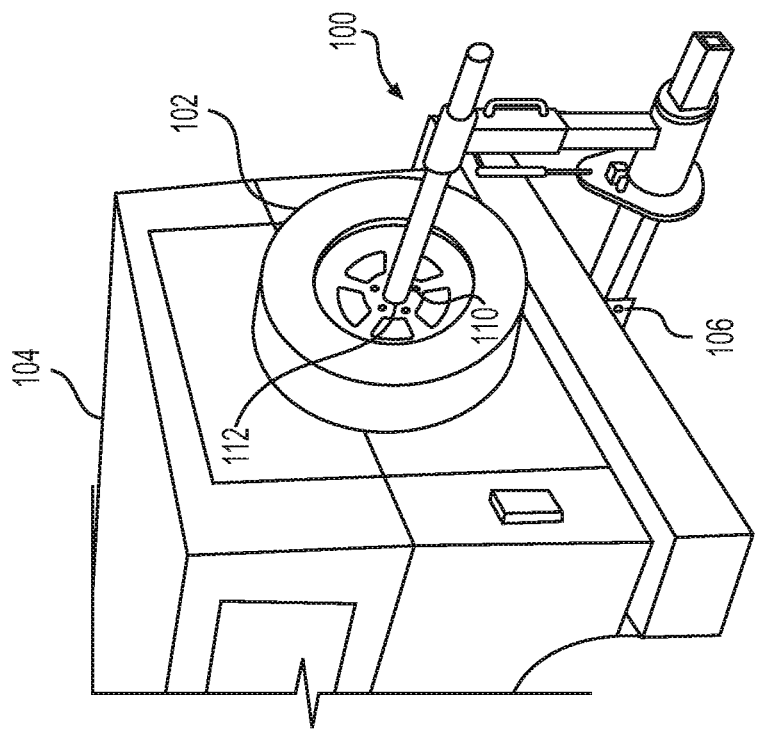

Reference is first made to FIGS. 1A and 1B, which respectively show block diagrams of an apparatus 100 that may support an article 102 with respect to a vehicle 104, in accordance with an embodiment of the present disclosure. It should be understood that the apparatus 100 depicted in FIGS. 1A and 1B may include additional features and that some of the features described herein may be removed and/or modified without departing from the scope of the apparatus 100. For instance, although particular reference is made herein to the article 102 being a wheel for a vehicle, it should be understood that the apparatus 100 may be implemented to support other types of articles without departing from a scope of the apparatus 100 disclosed herein.

The apparatus 100, which may equivalently be termed a hoist, a tire hoist, a lifting apparatus, or the like, may removably be mounted to the vehicle 104. For instance, the apparatus 100 may be inserted into an opening of a tow hitch 106 attached to the vehicle 104. In the example shown in FIGS. 1A and 1B, the apparatus 100 may be implemented to facilitate movement, e.g., lifting and/or lowering, of an article 102, e.g., a wheel, with respect to the vehicle 104. That is, the apparatus 100 may support the wheel 102 during the raising and/or lowering of the wheel 102 such that the apparatus 100 may support some or all of the weight of the wheel 102 at various positions with respect to the apparatus 100. That is, the apparatus 100 may provide various levels of leverage with respect to the weight of the wheel 102 as the wheel 102 is raised and/or lowered. As a result, the amount of force required to move the wheel 102 between the lowered and raised positions may be reduced as compared with lifting or lowering the wheel 102 without use of the apparatus 100.

As shown in FIG. 1A, the wheel 102 may be mounted to the rear of the vehicle 104 and may include a spare tire for the vehicle 104. The wheel 102 may include a set of holes 110 through which fasteners of a mounting mechanism 108 may extend when the wheel 102 is mounted to the vehicle 104. The wheel 102 may also include a central opening 112 that is located at a center of the wheel 102. In some examples, the apparatus 100 may engage the wheel 102 through the central opening 112, e.g., a portion of the apparatus 100 may be inserted into the central opening 112 while the vehicle 104 supports the wheel 112. In addition, the wheel 102 may be disengaged from the fasteners of the mounting mechanism 108 and may be slid onto the apparatus 100 in a direction away from the vehicle 104, such that the apparatus 100 may support the weight of the wheel 102 when the apparatus 100 is in the position shown in FIG. 1A.

According to examples, and as shown in FIG. 1B, a portion of the apparatus 100 may be rotated about an axis 114 as identified by the arrow 116 such that the wheel 102 may be lowered, e.g., to the ground. As the apparatus 100 may provide leverage during the rotation of the apparatus 100, the apparatus 100 may make it relatively easier for a user to lower the wheel 102 to the ground 102. The wheel 102 may be disengaged from the apparatus 100 following the wheel 102 reaching the ground 102. To move the wheel 102 to a position at which the wheel 102 may be mounted to the mounting mechanism 108, a portion of the apparatus 100 may be inserted into the central opening 112 of the wheel 102 while the wheel 102 is on the ground. In addition, the apparatus 100 may be rotated about the axis 114 in a direction opposite the directed denoted by the arrow 116. Once the apparatus 100 is moved to the position shown in FIG. 1A, the wheel 102 may be moved from the apparatus 100 onto the mounting mechanism 108. The apparatus 100 may then be removed from the tow hitch 106.

Figure 2B:
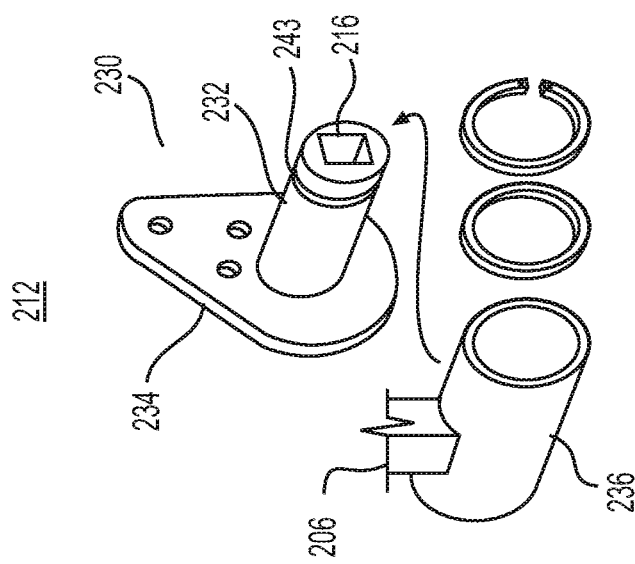
FIG. 2B shows an exploded view of a first connection member of the apparatus depicted in FIGS. 1A, 1B, and 2A, in accordance with an embodiment of the present disclosure.
Figure 2A:
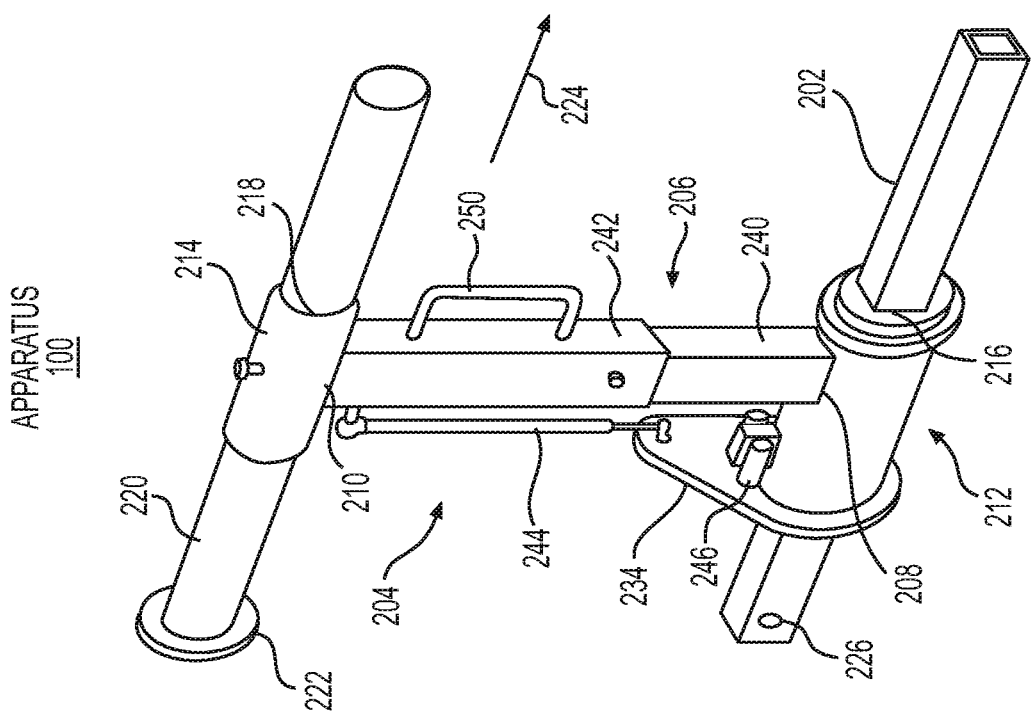
FIG. 2A shows a perspective view of the apparatus depicted in FIGS. 1A and 1B.

Turning now to FIG. 2A, there is shown a perspective view of the apparatus 100 depicted in FIGS. 1A and 1B. As shown, the apparatus 100 may include an elongated member 202 (which may equivalently be termed an elongated base member 202) and a mounting assembly 204. The mounting assembly 204 may include an extension section 206 that may have a first end 208 and a second end 210. The mounting assembly 204 may also include a first connection member 212 connected to the first end 208 and a second connection member 214 connected to the second end 210. The first connection member 212 may have a first opening 216 into which the elongated member 202 may extend and the second connection member 214 may have a second opening 218 into which a support member 220 may extend. In some examples, the elongated member 202 may be or may include a first section that is sized to be inserted into a tow hitch 106. In addition, the elongated member 202 may include a hole 226 through which a pin (not shown) may be inserted to hold the apparatus 100 within the tow hitch 106.

According to examples, the support member 220 may be slidable with respect to the second connection member 214 such that the second connection member 214 may engage the support member 220 at various locations along the length of the support member 220. As shown in FIG. 1A, a portion of the support member 220 may be inserted into the central opening 112 of the wheel 102 and the position of the support member 220 may be adjusted with respect to the second connection member 214 to enable the support member 220 to engage the central opening 112. The support member 220 may further include a cap element 222 that may be inserted into the central opening 112 to better engage the wheel 102, e.g., to prevent the wheel 102 from disengaging from the support member 220.

In some examples, the elongated member 202 may be slidable within the opening 216 of the first connection member 212 such that the relative position of the mounting assembly 204 may be varied along the length of the elongated member 202. Thus, for instance, and with respect to FIG. 1A, following engagement of the wheel 102 onto the support member 220, the extension member 206 and the support member 220 may be moved in a direction away from the vehicle 104, e.g., in the direction denoted by the arrow 224, to thus move the wheel 102 away from the vehicle 104.

The first connection member 212 may also be composed of a number of components that may enable rotation of the first connection member 212 and thus, the extension member 206 and the support member 220, with respect to the elongated member 202. The components of the first connection member 212, according to an embodiment, are depicted in FIG. 2B. As shown in FIG. 2B, the first connection member 212 may include a fixed connector 230 having a fixed connection section 232 connected to a flange section 234, in which the fixed connection section 232 includes the first opening 216 through which the elongated member 202 extends. In some examples, the cross section of the elongated member 202 may have a quadrilateral shape, e.g., a shape with flat sides such as a rectangle, a square, a hexagon, or the like, such that relative rotation between the fixed connector 230 and the elongated member 202 may be prevented.

The fixed connector 230 may also include a collar section 236 that may be positioned over the fixed connection section 232 such that the collar section 236 may be rotated with respect to the fixed connection section 232. As shown in FIG. 2B, the collar section 236 may be laterally fixed with respect to the fixed connection section 232 through rings 238, 240, in which one of the rings 240 may be a lockable ring. As shown, the fixed connection section 232 may include a slot 242 into which the lockable ring 242 may be inserted. As shown in FIG. 1B, the collar section 236 may be rotated as denoted by the arrow 116. In some examples, the fixed connector 230 may include a locking mechanism 246 that may prevent the collar section 236 from rotating beyond the positions shown in FIGS. 1A and 1B, e.g., may prevent the mounting assembly 204 from unintended rotation about the elongated member 202.

With reference back to FIG. 2A, the extension section 206 may extend perpendicularly to the elongated member 202. In addition, the extension section 206 may be formed of a first part 240 attached to the first connection member 212 and a second part 242 attached to the second connection member 214. The second part 242 may be laterally movable with respect to the first part 240 to vary a distance between the support member 220 and the elongated member 202. As shown, the second part 242 may be relatively wider than the first part 240 such that the first part 240 may be inserted into the second part 242.

The extension section 206 may further include a lift mechanism 244 that may apply an extensive force on the second part 242. That is, the lift mechanism 244 may be attached to the flange section 234 and to the second port 242 and may apply a separation force to cause the second part 242 to be pushed away from the first part 240, e.g., to bias the second part 242 in a direction away from the first connection member 212. The lift mechanism 244 may be a spring, a hydraulic mechanism, or the like. In addition, or alternatively to the lift mechanism 244, the first part 240 and the second part 242 may have mating components to maintain the second part 242 at any of a number of different positions with respect to the first part 240. As such, for instance, the apparatus 100 may be implemented to support articles 102 at various heights with respect to the elongated member 202. The apparatus 100 may further include a handle 250 that a user may use to carry the apparatus 100 and/or to move the second part 242 with respect to the first part 240 of the extension section 206.

According to examples, the apparatus 100 may be fabricated of any of various types of materials that may be of sufficient strength to support weights of various types of articles 102, e.g., various types of wheels 102, articles 102 of various weights, etc. For instance, the apparatus 100 may be fabricated of any of a variety of types of metals, plastics, and/or combinations thereof.

Figure 3A:
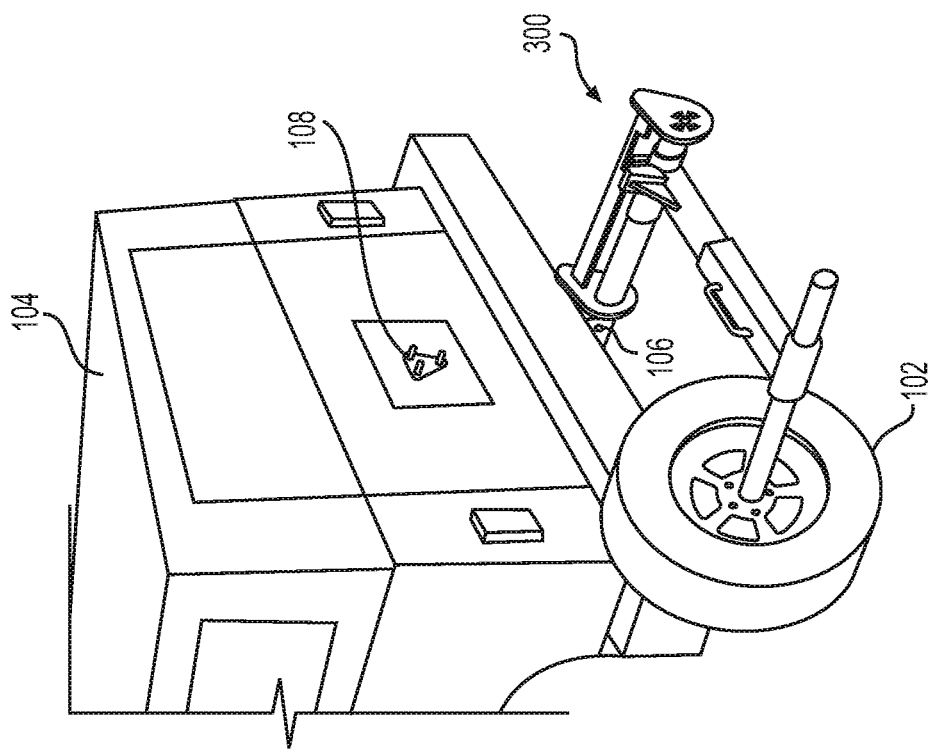
FIGS. 3A and 3B, respectively, show block diagrams of an example apparatus that may support an article with respect to a vehicle, in accordance with an embodiment of the present disclosure.
Figure 3B:
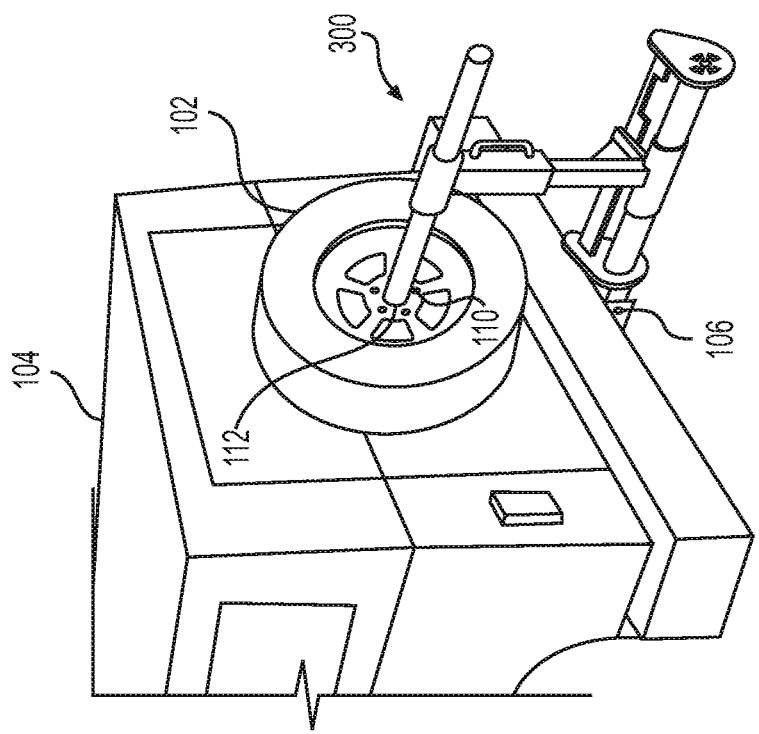

Reference is now made to FIGS. 3A and 3B, which respectively show block diagrams of an apparatus 300 that may support an article 102 with respect to a vehicle 104, in accordance with an embodiment of the present disclosure. It should be understood that the apparatus 300 depicted in FIGS. 3A and 3B may include additional features and that some of the features described herein may be removed and/or modified without departing from the scope of the apparatus 300. For instance, although particular reference is made herein to the article 102 being a wheel for a vehicle 104, it should be understood that the apparatus 300 may be implemented to support other types of articles without departing from a scope of the apparatus 300 disclosed herein.

The apparatus 300, which may equivalently be termed a hoist, a tire hoist, a lifting apparatus, or the like, may removably be mounted to the vehicle 104. Generally speaking, the apparatus 300 may be implemented in similar manners as the apparatus 100 discussed above with respect to FIGS. 1A and 1B to support an article 102, e.g., a wheel for a vehicle 104. As such, for instance, the apparatus 300 may be inserted into an opening of a tow hitch 106 attached to the vehicle 104 and may be implemented to facilitate movement, e.g., lifting and/or lowering, of an article 102, e.g., a wheel, with respect to the vehicle 104. The apparatus 300 may thus assist in the raising and/or lowering of the wheel 102 with respect to the vehicle 104.

Figure 4A:
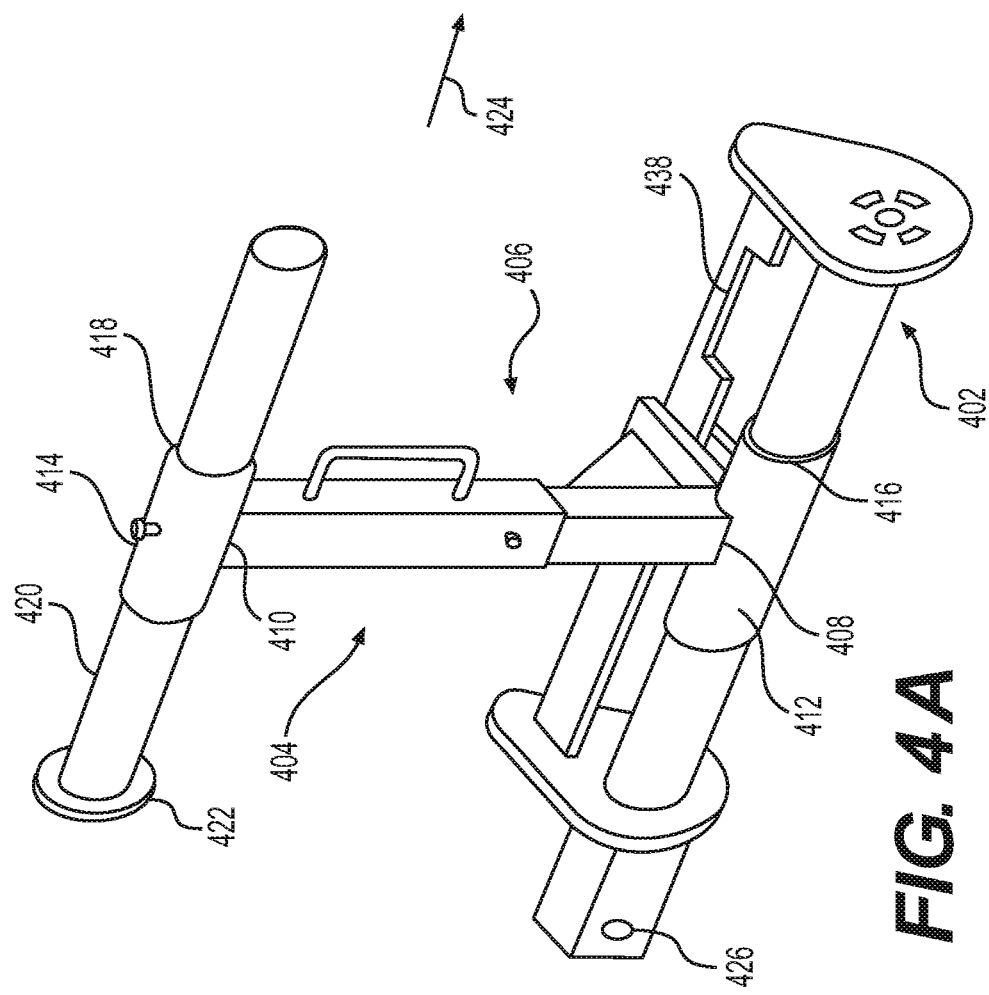
FIG. 4A shows a perspective view of the apparatus depicted in FIGS. 3A and 3B.

The apparatus 300, however, may have a different configuration than the apparatus 100 as shown in FIGS. 4A-4D. FIG. 4A shows a perspective view of the apparatus 300 depicted in FIGS. 3A and 3B and FIGS. 4B-4D respectively depict components of the apparatus 300. As shown, the apparatus 300 may include an elongated member 402 and a mounting assembly 404. The mounting assembly 404 may include an extension section 406 that may have a first end 408 and a second end 410. The mounting assembly 404 may also include a first connection member 412 connected to the first end 408 and a second connection member 414 connected to the second end 410. The first connection member 412 may have a first opening 416 into which a portion of the elongated member 402 may extend and the second connection member 414 may have a second opening 418 into which a support member 420 may extend. In some examples, the elongated member 402 may be or may include a first section that is sized to be inserted into a tow hitch 106. In addition, the elongated member 402 may include a hole 426 through which a pin (not shown) may be inserted to hold the apparatus 300 within the tow hitch 106.

According to examples, the support member 420 may be slidable with respect to the second connection member 414 such that the second connection member 414 may engage the support member 420 at various locations along the length of the support member 420. As shown in FIG. 3A, a portion of the support member 420 may be inserted into the central opening 112 of the wheel 102 and the position of the support member 420 may be adjusted with respect to the second connection member 414 to enable the support member 420 to engage the central opening 112. The support member 420 may further include a cap element 422 that may be inserted into the central opening 112 to better engage the wheel 102, e.g., to prevent the wheel 102 from disengaging from the support member 420.

In some examples, the elongated member 402 may be slidable within the opening 416 of the first connection member 412 such that the relative position of the mounting assembly 404 may be varied along the length of the elongated member 402. Thus, for instance, and with respect to FIG. 4A, following engagement of the wheel 102 onto the support member 420, the extension member 406 and the support member 420 may be moved in a direction away from the vehicle 104, e.g., in the direction denoted by the arrow 424, to thus move the wheel 102 away from the vehicle 104.

Reference is now made to FIGS. 4A and 4B. FIG. 4B shows an exploded top view of the elongated member 402 according to an example of the present disclosure. As shown, the elongated member 402 may include a first member 430 and a second member 432, in which the second member 432 may extend along a parallel axis to the first member 430. The elongated member 402 may also include a cap member 436 that may have openings that may mate with protrusions from the first member 430 and the second member 432 to prevent the second member 432 from rotating with respect to the first member 430. The cap member 434 may hold the second member 432 in relation to the first member 430 through use of a threaded fastener 436.

As also shown in FIGS. 4A and 4B, the second member 432 may include a notch 438 positioned at a distal location of the second member 432. As discussed herein, the second member 432 may prevent the mounting assembly 404 from rotating with respect to the first member 430 unless the mounting assembly 404 is positioned adjacent to the notch 438 as shown in FIG. 3B.

Reference is now made to FIGS. 4A, 4C, and 4D. FIGS. 4C and 4D, respectively, depict side and rear views of the mounting assembly 404, in accordance with an embodiment of the present disclosure. As shown, the extension section 406 of the mounting assembly 404 may extend perpendicularly to the elongated member 402. In addition, the extension section 406 may be formed of a first part 440 attached to the first connection member 412 and a second part 442 attached to the second connection member 414. The second part 442 may be laterally movable with respect to the first part 440 to vary a distance between the support member 420 and the elongated member 402. As shown, the second part 442 may be relatively wider than the first part 440 such that the first part 440 may be inserted into the second part 442.

As also shown, the mounting assembly 404 may include an engaging element 446 that may include a slot 448 into which the second member 432 may be inserted. For instance, the slot 448 may slidably engage the second member 432 such that the mounting assembly 404 may slide with respect to the elongated member 402 to prevent the mounting assembly 404 from rotating with respect to the first member 434. However, once the engaging element 446 reaches the notch 438, the mounting assembly 404 may rotate with respect to the first member 434, e.g., as shown in FIG. 3B. The apparatus 300 may further include a handle 450 that a user may use to carry the apparatus 300 and/or to move the second part 442 with respect to the first part 440 of the extension section 406.

Although not shown in FIG. 3A or 3B, the extension section 406 may include a lift mechanism 244 that may apply an extensive force on the second part 442, for instance, as discussed above with respect to FIGS. 1A and 1B. In addition, the apparatus 300 may be fabricated of any of various types of materials that may be of sufficient strength to support weights of various types of articles 102, e.g., various types of wheels 302. For instance, the apparatus 300 may be fabricated of any of a variety of types of metals, plastics, and/or combinations thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims— and their equivalents—in which all terms are meant in their broadest reasonable sense unless otherwise indicated.

What is claimed is:

1. An apparatus comprising:
    an elongated member;
    a mounting assembly including:
        an extension section having a first end and a second end;
        a first connection member connected to the first end of the extension section and having a first opening, wherein the elongated member extends through the first opening in the first connection member, wherein the first connection member is slidable along a length of the elongated member and rotatable about a longitudinal axis of the elongated member, and wherein the extension section extends perpendicularly to the elongated member; and a second connection member connected the second end of the extension section and having a second opening; and a support member extending through the second opening, wherein the extension section further includes:

a first part attached to the first connection member;

a second part attached to the second connection member, wherein the second part is laterally movable with respect to the first part to vary a distance between the support member and the elongated member; and a lift mechanism to bias the second part in a direction away from the first connection member.

2. The apparatus of claim 1, wherein the elongated member includes a first section that is sized to be inserted into a tow hitch.

3. The apparatus of claim 1, wherein the support member includes a cap element to engage an article.

4. The apparatus of claim 1, wherein the elongated member comprises a plurality of flat sides and wherein the first connection member comprises mating components to enable the first connection member to rotate with respect to the elongated member.

5. The apparatus of claim 1, wherein the mounting assembly further comprises a locking mechanism to prevent unintended rotation of the mounting assembly about the elongated member.

6. The apparatus of claim 5, wherein the first connection member includes a flange section and wherein the locking mechanism is connected to the flange section.

7. An apparatus comprising:
an elongated member;
a mounting assembly including:
an extension section having a first end and a second end;
a first connection member connected to the first end of the extension section and having a first opening, wherein the elongated member extends through the first opening in the first connection member, and wherein the first connection member is slidable along a length of the elongated member and rotatable about a longitudinal axis of the elongated member; and
a second connection member connected the second end of the extension section and having a second opening, wherein the elongated member comprises a first member and a second member, the second member extending along a parallel axis to the first member, the mounting assembly further including an engaging element that is to slidably engage the second member, wherein the second member includes a notch positioned at a distal location of the second member, and wherein the engaging element is to disengage from the second member at the notch to enable the mounting assembly to rotate about a longitudinal axis of the first member; and
a support member extending through the second opening.

8. A tire hoist comprising:
a mounting assembly including:
an extension section having a first end and a second end;
a first connection member connected to the first end of the extension section and having a first opening; and a second connection member connected the second end of the extension section and having a second opening;

an elongated member having a first end sized to be inserted into a tow hitch of an automobile, wherein the elongated member extends through the first opening, wherein the mounting assembly is movable with respect to the elongated member along a longitudinal axis of the elongated member and is rotatable about the longitudinal axis of the elongated member, wherein the mounting assembly further comprises:

a plate extending from the first connection member, the plate including a slot and a pin that is removably inserted into the slot to prevent unintended rotation of the mounting assembly about the elongated member; and a support member extending through the second opening, the support member having a cap element to engage a tire.

9. The tire hoist of claim 8, wherein the extension section extends perpendicularly to the elongated member and further includes:

a first part attached to the first connection member; and a second part attached to the second connection member, wherein the second part is laterally movable with respect to the first part to vary a distance between the support member and the elongated member.

10. The tire hoist of claim 9, wherein the extension section further comprises a lift mechanism to bias the second part in a direction away from the first connection member.

11. The tire hoist of claim 8, wherein the elongated member comprises a plurality of flat sides and wherein the first connection member comprises mating components to enable the first connection member to rotate about the elongated member.

12. The tire hoist of claim 8, wherein the elongated member comprises a first member and a second member, the second member extending along a parallel axis to the first member, the mounting assembly further including an engaging element that is to slidably engage the second member, wherein the second member includes a notch positioned at a distal location of the second member, and wherein the engaging element is to disengage from the second member at the notch to enable the mounting assembly to rotate about a longitudinal axis of the first member.

13. The tire hoist of claim 8, wherein the mounting assembly is to be positioned at a first position with respect to the elongated member to insert the support member into the tire, wherein the support member is to support the tire, wherein the mounting assembly is to be moved to a second position with respect to the elongated member, and wherein the mounting assembly is to be rotated about the longitudinal axis of the elongated member to lower the tire.

14. The tire hoist of claim 8, wherein the mounting assembly is to be rotated to a first position with respect to the elongated member and the support member is to be inserted into an opening in the tire, wherein the mounting assembly is to be rotated to a second position with respect to the elongated member to raise the tire, and wherein the mounting assembly is to be slid along the elongated member to position the tire for mounting onto the automobile.

15. A lifting apparatus comprising:
an elongated base member, wherein the elongated based member comprises a first member and a second member, the second member extending along a parallel axis to the first member;

a mounting assembly slidably attached to the elongated base member, wherein the mounting assembly is rotatable about the elongated base member when the mounting assembly is positioned at a first location on the elongated base member and the mounting assembly is not rotatable about the elongated base member when the mounting assembly is positioned at a second location on the elongated base member, wherein the mounting assembly further including an engaging element that is to slidably engage the second member, wherein the second member includes a notch positioned at a distal location of the second member, and wherein the engaging element is to disengage from the second member at the notch to enable the mounting assembly to rotate about a longitudinal axis of the first member; and a support member attached to the mounting assembly, wherein the support member is positioned distally on the mounting assembly with respect to the elongated base member.

16. The lifting apparatus of claim 15, wherein the mounting assembly comprises an extension section that extends perpendicularly to the elongated base member, the extension section including:

a first part; and a second part, wherein the second part is laterally movable with respect to the first part to vary a distance between the support member and the elongated base member.

* * * * *